Patented Aug. 9, 1938

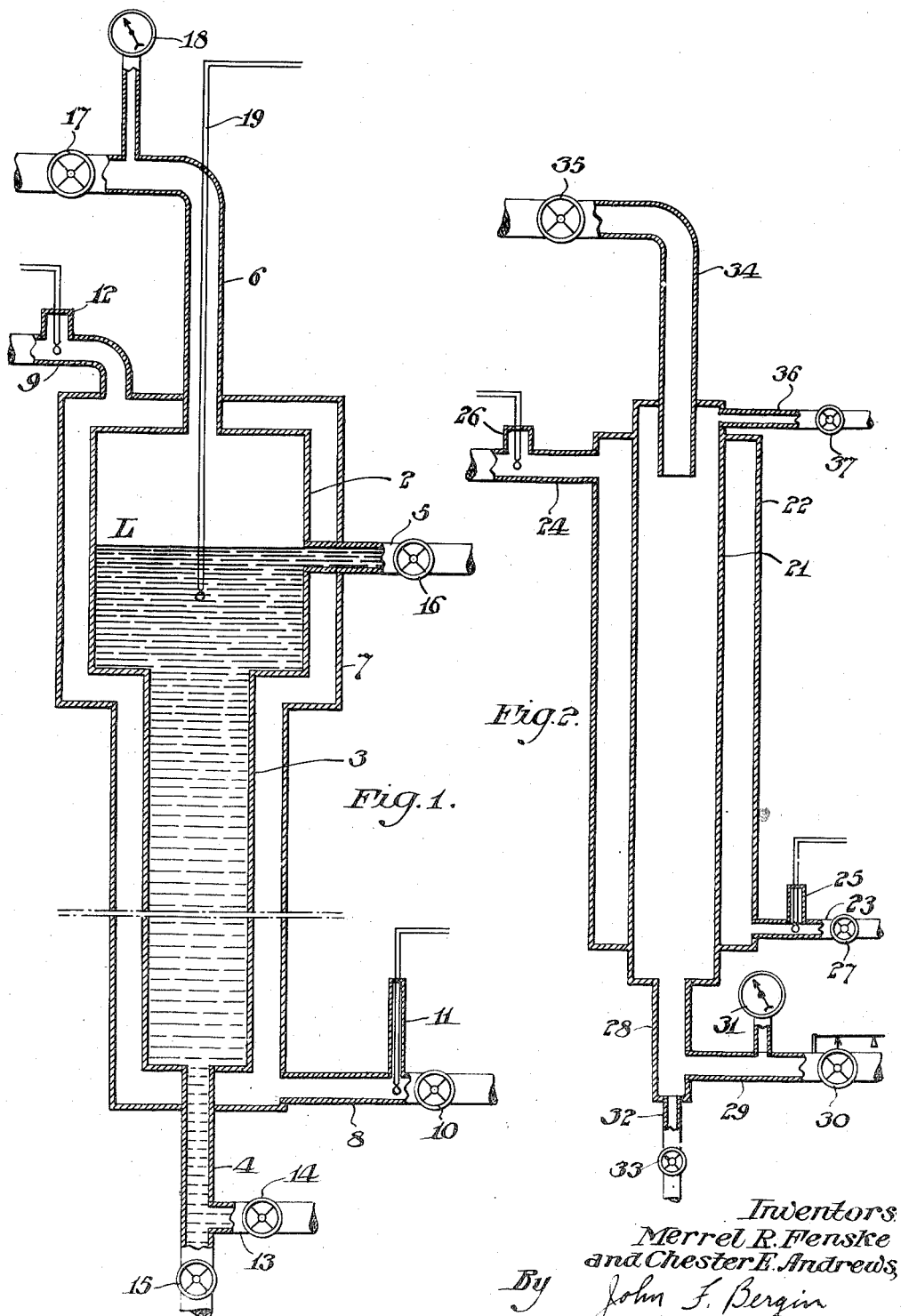

2,125,905

UNITED STATES PATENT OFFICE 2,125,905

PROCESS OF SEPARATING A MIXTURE OF TRIMETHYLAMINE AND AMMONIA

Merrell R. Fenske, State College, and Chester E. Andrews, Overbrook, Pa., assignors to Röhm & Haas Company, Philadelphia, Pa.

Application March 3, 1937, Serial No. 128,740

4 Claims. (Cl. 260—127)

This invention relates to the process of manufacturing methylamines and particularly to a process for fractionally separating them from each other and from ammonia.

In the process of producing the methylamines from methanol and ammonia catalytically, the product contains all three methylamines, mono-, di- and tri-, as well as water and the unreacted ammonia and methanol. On distillation the trimethylamine forms a constant boiling mixture with ammonia and also with mono-methylamine so that it is impossible to separate these materials completely by distillation. It is possible to remove all the trimethylamine from the mixture, as a constant boiling mixture, provided sufficient ammonia is present, and then to separate the mono- and dimethylamines by ordinary fractional distillation. In this way pure monomethylamine and pure dimethylamine could be prepared but it was impossible to separate the trimethylamine in a pure state from the ammonia except by chemical means.

It is an object of this invention to provide a method whereby the constant boiling mixture of trimethylamine and ammonia may be separated completely into its individual components without causing any chemical changes to take place. The present invention is based on the fact that the solubilities of trimethylamine and ammonia in any given solvent are different, and by suitably arranging the relative amounts of solvent and gas mixture fed into the system in a given time, a complete separation of the two can be attained.

The mixture of trimethylamine and ammonia does not have to correspond in composition to the constant boiling mixture, since any mixture of the two can be saparated in this manner. In the examples chosen to illustrate this invention a mixture approximating that of the constant boiling mixture is used, for the reason that such mixtures are met with more frequently in the process of manufacturing methylamines. The liquid used for the separation of the two components will determine which of the two remains in solution, the other being removed in the gaseous form and subsequently condensed. When water is used for the separation, the ammonia will remain in the water and the amine will be removed as a gas. If an organic solvent, such as triisobutylene, or a petroleum fraction, such as gasoline, kerosene, gas oil or even lubricating oil, is used, the ammonia will pass through as a gas, leaving the amine dissolved in the liquid.

The process is preferably carried out under superatmospheric pressure and the actual pressure used will be chosen so as to permit the condensation of the overhead gas to take place within the system and within the temperature range of available cooling water. Variations in pressure have only a very slight effect on the efficiency of the separation.

The process may be carried out in any suitable apparatus such as is shown in the drawing attached hereto. The gas mixture to be separated may be bubbled through the liquid in an apparatus such as is shown in Figure 1, or it may be run countercurrent to the liquid in an apparatus as shown in Figure 2.

Referring to the drawing and specifically to Figure 1, a cylindrical vessel 2 having a pipe 3 attached to the bottom, an inlet pipe 4 and outlet pipes 5 and 6, is mounted in a jacket 7 which completely surrounds the vessel 2 and lower extension 3. The jacket has an inlet pipe 8 and an outlet pipe 9. A valve 10 is inserted in the inlet pipe 9 to control the flow of heating or cooling liquid to the jacket. Thermocouples or thermometers 11 and 12 are inserted in the inlet and outlet pipes respectively, to record the temperature of the heating or cooling liquid. A pipe 13 with valve 14 is connected to the inlet pipe 4 of the inner vessel and a valve 15 is attached to an extension of inlet pipe 4. The outlet pipe 5 has a valve 16 to control the flow of solution from the inner vessel. The outlet pipe 6 also has a valve 17 to control the flow of gas from the inner vessel and a pressure gage 18 for recording the pressure within the vessel 2. A thermocouple or thermometer 19 is inserted in the inner vessel 2 to show the temperature of the liquid.

Figure 2 shows a different apparatus for carrying out the same process. An inner tube 21 is surrounded by a jacket 22. This jacket has an inlet pipe 23 and an outlet pipe 24 in which are inserted thermocouples or thermometers 25 and 26 for recording the temperature of the heating fluid. A valve 27 in the inlet line controls the flow of this fluid.

The inner tube has a lower extension 28 to which an inlet pipe 29 carrying a regulating valve 30 and a pressure gauge 31, is attached. The lower extension 28 also carries a sight glass 32 and a valve 33 for regulating the flow of liquid from the inner tube. An inlet pipe 34 and valve 35 are attached to the upper end of the inner tube as are the outlet pipe 36 and valve 37.

In operating the apparatus shown in Figure 1, water or other heating medium at any desired temperature is passed continuously through the jacket. In order to assist in maintaining the temperature the jacket may be insulated if desired.

The inner vessel is filled with water or other liquid to the level L so that it will just overflow through pipe 5. The trimethylamine and ammonia to be separated are then admitted through valve 14 and by keeping valve 17 closed, any desired pressure up to the saturation pressure of the solution may be attained. Valve 17 is then opened enough to keep the pressure reasonably constant. By regulating valves 15 and 16 a constant flow of liquid can be maintained through the apparatus.

As the mixture of gases passes through, the more soluble one is concentrated in the liquid and the less soluble one passes through and is removed through valve 17.

After the apparatus is in operation the flow of liquid and gas mixture are set at constant rates which results in a constant degree of separation of the components of the gas.

The apparatus shown in Figure 2 operates somewhat differently. The inner tube 21 is packed with any ordinary tower packing such as rings, chains, broken tile, etc. Bubble plates may also be used if desired. Water or other heating or cooling fluid is passed through the jacket so as to maintain the desired temperature within the inner tube 21. The gas mixture is admitted at a constant rate through valve 30 and when the desired pressure is attained it is regulated by proper adjustment of the exit valve 37. Water or other absorbing liquid is admitted through valve 35 and pipe 34 and trickles down over the packing through the sight glass 32 and is drawn off through valve 33.

As the gases and liquid pass in opposite directions the more soluble one is removed by the liquid and the less soluble one passes out through valve 37. After the apparatus is in operation the rates of flow of gas and liquid are kept constant so that a constant degree of separation of the components of the gas is attained.

The pressure and temperature may be varied over a considerable range without affecting the efficiency of the separation. It is even possible to adjust them so that two liquid phases are present in the inner tube.

The following examples will serve to illustrate the operation of both types of apparatus but the invention is not limited to the exact conditions of temperature, pressure, rates of flow or composition of the gas mixture given in the examples, as the invention may be otherwise practiced within the scope of the appended claims.

*Example 1.*—The same gas mixture as in previous examples was charged to the apparatus shown in Figure 2. The temperature of the water entering the jacket was 93° F. and at the outlet was 118° F. The pressure within the tube was 30 pounds per square inch. Triisobutylene was used as the absorbing liquid and was fed at a rate of 0.47 pound per hour. The gas mixture was fed at 0.23 pound per hour of which 0.074 pound or 32% was absorbed, the remainder passing through the system. The overhead gas contained 7% trimethylamine and 93% of ammonia or 10% and 38% respectively of the total amounts fed to the system.

*Example 2.*—Kerosene was substituted for the triisobutylene and was fed at the rate of 0.49 pound per hour. The same gas mixture as previously was fed at the rate of 0.17 pound per hour of which 0.034 or 20% was absorbed. The overhead gas contained 3% of trimethylamine and 97% of ammonia and the gases contained in the liquid contained no ammonia. In this case practically a complete separation of the two gases was obtained on a single pass through the apparatus.

This application is a continuation-in-part of copending application Serial No. 748,476 filed October 16, 1934 which has matured into U. S. Patent #2,091,630.

We claim:

1. The process of separating a mixture of trimethylamine and ammonia which comprises selectively absorbing the trimethylamine in an aliphatic hydrocarbon solvent by passing the mixture in contact with a stream of said solvent flowing countercurrent thereto.

2. The process of separating a mixture of trimethylamine and ammonia which comprises selectively absorbing the trimethylamine in kerosene by passing the mixture in contact with a stream of kerosene flowing countercurrent thereto.

3. The process of separating a mixture of trimethylamine and ammonia which comprises selectively absorbing the trimethylamine in an aliphatic hydrocarbon solvent.

4. The process of separating a mixture of trimethylamine and ammonia which comprises selectively absorbing the trimethylamine in kerosene.

MERRELL R. FENSKE.
CHESTER E. ANDREWS.